United States Patent
Nakatsuji et al.

(10) Patent No.: US 8,796,996 B2
(45) Date of Patent: Aug. 5, 2014

(54) CHARGE CONTROL CIRCUIT, BATTERY PACK, AND CHARGE SYSTEM

(75) Inventors: Toshiyuki Nakatsuji, Hyogo (JP); Tsuyoshi Morimoto, Osaka (JP)

(73) Assignee: Panasonic Corporation, Osaka (JP)

( * ) Notice: Subject to any disclaimer, the term of this patent is extended or adjusted under 35 U.S.C. 154(b) by 511 days.

(21) Appl. No.: 13/142,971

(22) PCT Filed: Jun. 4, 2010

(86) PCT No.: PCT/JP2010/003767
§ 371 (c)(1),
(2), (4) Date: Jun. 30, 2011

(87) PCT Pub. No.: WO2010/146795
PCT Pub. Date: Dec. 23, 2010

(65) Prior Publication Data
US 2011/0267009 A1 Nov. 3, 2011

(30) Foreign Application Priority Data
Jun. 18, 2009 (JP) ................................. 2009-145264

(51) Int. Cl.
*H02J 7/00* (2006.01)
*H02J 7/14* (2006.01)
*H01M 10/44* (2006.01)
*H01M 10/42* (2006.01)
*H01M 10/48* (2006.01)
*H01M 2/34* (2006.01)
*H01M 10/46* (2006.01)

(52) U.S. Cl.
CPC ............. *H02J 7/0073* (2013.01); *H01M 10/44* (2013.01); *H01M 10/425* (2013.01); *H01M 10/48* (2013.01); *H01M 10/486* (2013.01); *Y02E 60/12* (2013.01); *H01M 10/46* (2013.01); *H01M 2200/10* (2013.01); *H01M 2/348* (2013.01); *H01M 2/34* (2013.01)
USPC ............ 320/134; 320/137; 320/148; 320/156; 320/161

(58) Field of Classification Search
USPC ......... 320/134, 136, 128, 135, 137, 148, 149, 320/156, 157, 161, 162
See application file for complete search history.

(56) References Cited

U.S. PATENT DOCUMENTS

| | | | |
|---|---|---|---|
| 5,442,274 A | | 8/1995 | Tamai |
| 5,493,197 A | * | 2/1996 | Eguchi et al. ................. 320/116 |
| 6,060,185 A | * | 5/2000 | Okutoh ............................. 429/7 |
| 6,307,353 B1 | * | 10/2001 | Shiojima ....................... 320/139 |
| 7,023,180 B2 | * | 4/2006 | Nagai et al. ................... 320/162 |
| 7,557,584 B2 | * | 7/2009 | Murakami et al. ............ 324/429 |
| 2002/0175659 A1 | * | 11/2002 | Sakakibara .................... 320/150 |
| 2009/0102428 A1 | | 4/2009 | Aradachi et al. |
| 2009/0284224 A1 | * | 11/2009 | Miyazaki et al. ............. 320/118 |
| 2009/0315520 A1 | * | 12/2009 | Nishiyama et al. ........... 320/134 |
| 2010/0102778 A1 | | 4/2010 | Otsu et al. |

FOREIGN PATENT DOCUMENTS

| | | |
|---|---|---|
| CN | 101325342 A | 12/2008 |
| JP | 06-078471 | 3/1994 |

FOREIGN PATENT DOCUMENTS

| | | |
|---|---|---|
| JP | 10-014125 | 1/1998 |
| JP | 2007-274813 | 10/2007 |
| JP | 2008-259293 A | 10/2008 |
| JP | 2009-112115 | 5/2009 |
| JP | 2009-123560 A | 6/2009 |
| WO | WO 2008/102528 A1 | 8/2008 |

* cited by examiner

*Primary Examiner* — Edward Tso
*Assistant Examiner* — Alexis Boateng
(74) *Attorney, Agent, or Firm* — McDermott Will & Emery LLP

(57) ABSTRACT

A charge control circuit includes a charge control unit that controls an operation of a charging unit that charges a rechargeable battery; and a voltage detection unit that detects a terminal voltage of the rechargeable battery, wherein when a terminal voltage of the rechargeable battery as detected by the voltage detection unit is lower than a predetermined first threshold-value voltage, being lower than a full-charge voltage which is a terminal voltage of the rechargeable battery in full charge, the charge control unit causes a constant current charging to the rechargeable battery by requesting the charging unit to supply a charging current of a predetermined first current value, causing the charging unit to supply a charging current of the first current value to the rechargeable battery, when the terminal voltage of the rechargeable battery as detected by the voltage detection unit exceeds the first threshold-value voltage but is less than the full charge voltage, the charge control unit causes the constant current charging to the rechargeable battery by requesting the charging unit to supply a charging current of a second current value that is smaller than the first current value, causing the charging unit to supply a charging current of the second current value to the rechargeable battery, and when the terminal voltage of the rechargeable battery as detected by the voltage detection unit is equal to or greater than the full charge voltage, the charge control unit causes a constant voltage charging to be carried out by causing the charging unit to supply the full charge voltage to the rechargeable battery, as a charge voltage.

9 Claims, 5 Drawing Sheets

US 8,796,996 B2

CHARGE CONTROL CIRCUIT, BATTERY PACK, AND CHARGE SYSTEM

RELATED APPLICATIONS

This application is the U.S. National Phase under 35 U.S.C. §371 of International Application No. PCT/JP2010/003767, filed on Jun. 4, 2010, which in turn claims the benefit of Japanese Application No. 2009-145264, filed on Jun. 18, 2009, the disclosures of which Applications are incorporated by reference herein.

TECHNICAL FIELD

The present invention relates to a charge control circuit that controls charging of a rechargeable battery, and to a battery pack and to a charge system that are provided with the charge control circuit.

BACKGROUND ART

Conventional known ways of charging a rechargeable battery include CCCV (constant current-constant voltage) charging schemes wherein constant current charging, in which charging is carried out at a constant current value, is performed initially, and when the terminal voltage of the rechargeable battery reaches a charge termination voltage set beforehand, there is performed constant voltage charging, in which the battery is charged at a constant charge voltage, through application of the charge termination voltage to the rechargeable battery (for instance, see Patent document 1).

In a CCCV charging scheme, the open-circuit voltage (OCV) at the time of full charge when the SOC (State of Charge) of the rechargeable battery is 100%, i.e. the full charge voltage, is set as the charge termination voltage. The rechargeable battery has an internal resistance R. Therefore, when the terminal voltage of the rechargeable battery reaches the charge termination voltage by constant current charging, the terminal voltage of the rechargeable battery includes a voltage drop IR derived from the charge current I flowing through the internal resistance R. Consequently, the open-circuit voltage of the rechargeable battery falls still short of the charge termination voltage (=full charge voltage), and, accordingly, the rechargeable battery is not yet in full charge.

Thus, further constant voltage charging is accompanied by a gradual decrease in the charge current and in a decreased voltage drop IR. The open-circuit voltage of the rechargeable battery increases in proportion to the reduction in voltage drop IR. The rechargeable battery can be brought to full charge by terminating charging when the charge current is equal to or smaller than a charge termination current value, set beforehand to a small current value, and the voltage drop IR becomes negligibly small, i.e. when the open-circuit voltage of the rechargeable battery becomes substantially identical to the full charge voltage.

In such a CCCV charging scheme, the charging time is shortened by charging the rechargeable battery at a constant current value that is comparatively large, for instance about 0.7 It, until the close-circuit terminal voltage of the rechargeable battery reaches the full charge voltage. Herein, 1 It (battery capacity (Ah)/1 (h)) denotes the current value at the point in time where the residual charge of the rechargeable battery becomes zero after one hour, for constant-current discharge of the nominal capacity value of the rechargeable battery.

In a CCCV charging scheme, once the close-circuit terminal voltage of the rechargeable battery reaches the full charge voltage, the charge current decreases naturally through constant voltage charging at the full charge voltage. Therefore, deterioration of the rechargeable battery through overcharging is to be avoided.

When in a CCCV charging scheme constant current charging is carried out in a state where the closed-circuit terminal voltage of the rechargeable battery has not reached yet the full charge voltage, however, deterioration due to flow of charge current is likelier to occur in a state where the closed-circuit terminal voltage has reached the vicinity of the full charge voltage, through an increase in the SOC of the rechargeable battery, than at a time when the SOC of the rechargeable battery is small. This is problematic in that, as a result, the rechargeable battery may deteriorate when constant current charging is carried out, at a same current value, from a state where SOC is close to 0% up to a state close to full charge. The above phenomenon was particularly marked at low temperature and high temperature.

CITATION LIST

Patent Literature

Patent Document 1: Japanese Patent Application Laid-Open No. H 6-78471

SUMMARY OF THE INVENTION

It is an object of the present invention to provide a charge control circuit, a battery pack and a charge system that allow reducing rechargeable battery deterioration during constant current charging by CCCV charging.

A charge control circuit according to one aspect of the present invention comprises a charge control unit that controls an operation of a charging unit that charges a rechargeable battery; and a voltage detection unit that detects a terminal voltage of the rechargeable battery, wherein when a terminal voltage of the rechargeable battery as detected by the voltage detection unit is lower than a predetermined first threshold-value voltage, being lower than a full-charge voltage which is a terminal voltage of the rechargeable battery in full charge, the charge control unit causes a constant current charging to the rechargeable battery by requesting the charging unit to supply a charging current of a predetermined first current value, causing the charging unit to supply a charging current of the first current value to the rechargeable battery, when the terminal voltage of the rechargeable battery as detected by the voltage detection unit exceeds the first threshold-value voltage but is less than the full charge voltage, the charge control unit causes the constant current charging to the rechargeable battery by requesting the charging unit to supply a charging current of a second current value that is smaller than the first current value, causing the charging unit to supply a charging current of the second current value to the rechargeable battery, and when the terminal voltage of the rechargeable battery as detected by the voltage detection unit is equal to or greater than the full charge voltage, the charge control unit causes a constant voltage charging to be carried out by causing the charging unit to supply the full charge voltage to the rechargeable battery, as a charge voltage.

A battery pack according to an aspect of the present invention comprises the above-described charge control circuit and the rechargeable battery.

A charge system according to an aspect of the present invention comprises the above-described charge control circuit, the rechargeable battery and the charging unit.

DESCRIPTION OF EMBODIMENTS

Figure 1:
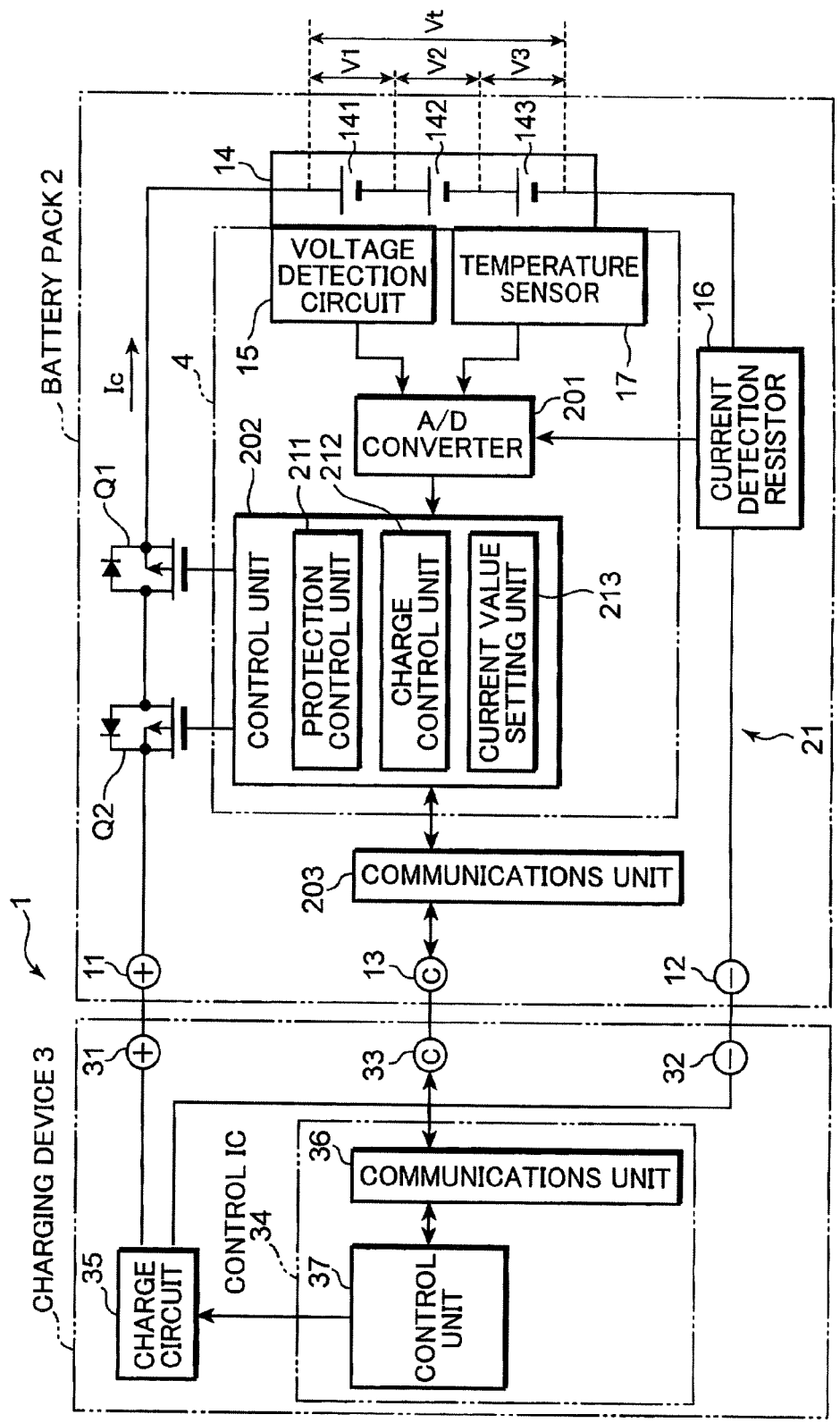
FIG. 1 is a block diagram illustrating an example of the configuration of a battery pack, and of a charge system, that are provided with a charge control circuit according to an embodiment of the present invention.

Embodiments of the present invention are explained below with reference to accompanying drawings. In the drawings, features denoted with the same reference numerals are identical features, and a recurrent explanation thereof will be omitted. FIG. 1 is a block diagram illustrating an example of the configuration of a battery pack and of a charge system that comprise a charge control circuit according to an embodiment of the present invention. A charge system 1 illustrated in FIG. 1 comprises a combination of a battery pack 2 and a charging device 3 (charging unit).

The charge system 1 may further comprise a load device, not shown, that is supplied with power from the battery pack 2, for instance, an electronic device such as a portable personal computer, a digital camera or a mobile phone, or an electronic device system used in, for instance, a vehicle such as an electric automobile or a hybrid car. In this case, the battery pack 2 is directly charged from the charging device 3 in FIG. 1, but the battery pack 2 may be fitted to the load device, and be charged via the load device.

The battery pack 2 comprises connection terminals 11, 12, 13, an assembled battery 14 (rechargeable battery), a current detection resistor 16 (current detection unit), a charge control circuit 4, a communications unit 203 and switching elements Q1, Q2. The charge control circuit 4 comprises an analog-digital (A/D) converter 201, voltage detection unit), a control unit 202, a voltage detection circuit 15 (voltage detection unit), and a temperature sensor 17 (temperature detection unit).

The charge system 1 is not necessarily limited to a configuration where the system can be separated into the battery pack 2 and the charging device 3, and thus one single and charge control circuit 4 may be provided for the entire charge system 1. The charge control circuit 4 may be provided shared across by the battery pack 2 and the charging device 3. The assembled battery 14 need not be in the form of a battery pack, and for instance the protective circuit 4 may be configured in the form of an on-board ECU (Electric Control Unit).

The charging device 3 comprises connection terminals 31, 32, 33, a control IC 34, and a charge circuit 35. The control IC 34 comprises a communications unit 36 and a control unit 37. The charge circuit 35 is connected to connection terminals 31, 32 for power supply, and the communications unit 36 is connected to the connection terminal 33. When the battery pack 2 is fitted to the charging device 3, the connection terminals 11, 12, 13 of the battery pack 2 become respectively connected to the connection terminals 31, 32, 33 of the external circuit 3.

The charging unit 35 is a power source circuit that supplies voltage and current, in accordance with control signals from the control unit 37, to the battery pack 2, via the connection terminals 31, 32. The communications units 203, 36 are communication interface circuits configured so as to be capable of exchanging data via the connection terminals 13, 33.

The control unit 37 is a control circuit configured using, for instance, a microcomputer. When a request instruction sent by the communications unit 203 from the control unit 201 in the battery pack 2 is received by the communications unit 36, the control unit 37 controls the charging unit 35 in accordance with the request instruction received by the communications unit 36, to cause thereby current and voltage to be outputted to from the charging unit 35 to the connection terminals 11, 12 in accordance with the request instruction sent from the battery pack 2.

As a result, the charging device 3 outputs current and voltage to battery pack 2, in accordance with the request from the control unit 202 of the battery pack 2. The charging device 3 is not limited to an example in which the charging device 3 comprises the control unit 37, and may be configured as a combination of a constant current circuit and a constant voltage circuit.

In the battery pack 2, the connection terminal 11 is connected to a positive electrode of the assembled battery 14 via a switching element Q2 for charge (charge prohibiting unit) and a switching element Q1 for discharge. For instance, p-channel FETs (Field Effect Transistors) are used as the switching elements Q1, Q2. A parasitic-diode cathode of the switching element Q1 is in the direction of the assembled battery 14. A parasitic-diode cathode of the switching element Q2 is in the direction of the connection terminal 11.

The connection terminal 12 is connected to the negative electrode of the assembled battery 14, via the current detection resistor 16, such that a current path is configured from the connection terminal 11 to the connection terminal 12, via the switching elements Q2, Q1, the assembled battery 14 and the current detection resistor 16. Needless to say, n-channel FETs may also be used as the switching elements Q1, Q2.

The assembled battery 14 is an assembled battery wherein a plurality, for instance, three rechargeable batteries (cells) 141, 142, 143 are connected in series. The rechargeable batteries 141, 142, 143 are, for instance, lithium ion rechargeable batteries or nickel hydride rechargeable batteries. The assembled battery 14 may be, for instance, a single battery (cell), or an assembled battery in which a plurality of rechargeable batteries is connected in parallel, or an assembled battery in which rechargeable batteries are connected in a combination of series and parallel connections.

The current detection resistor 16 converts the charge current and the discharge current of the assembled battery 14 into a voltage value.

The temperature sensor 17 is a temperature sensor that detects a temperature t of the assembled battery 14. The temperature t of the assembled battery 14 as detected by the temperature sensor 17 is inputted into the analog-digital converter 201 in the charge control circuit 4.

A current value of the charge/discharge current Ic detected by the current detection resistor 16 is also inputted to the analog-digital converter 201 in the charge control circuit 4.

The voltage detection circuit 15 detects a respective terminal voltage V1, V2, V3 of the rechargeable batteries 141, 142, 143, as well as a terminal voltage Vt of the assembled battery 14, and outputs the voltages to the analog-digital converter 201. The control unit 202 may also calculate the terminal voltage Vt by totaling the terminal voltages V1, V2, V3.

The analog-digital converter 201 converts each input value into a digital value, and outputs the latter to the control unit 202. In this case, the current detection unit in one example comprises the current detection resistor 16 and the analog-digital converter 201, and the voltage detection unit in one example comprises the voltage detection circuit 15 and the analog-digital converter 201.

The control unit 202 may be configured so as to comprise, for instance, a CPU (Central Processing Unit) that carries out predetermined computational processes, a ROM (Read Only Memory) in which a predetermined control program is stored, a RAM (Random Access Memory) in which data is temporarily stored, as well as peripheral circuits of the foregoing. Through execution of a control program stored in the ROM, the control unit 202 functions as a protection control unit 211, a charge control unit 212 and a current value setting unit 213.

On the basis of various input values from the analog-digital converter 201, the protection control unit 211 detects an anomaly outside the battery pack 2, for instance a short-circuit between the connection terminals 11, 12 and/or anomalous current from the charging device 3, as well as anomalies in the form of, for instance, anomalous rises in temperature in the assembled battery 14. Specifically, the protection control unit 211 determines that there has occurred a short-circuit between the connection terminals 11, 12 or an anomaly caused by a short-circuit between the connection terminals 11, 12 or by anomalous current from the charging device 3, when, for instance, the current value detected by the current detection resistor 16 exceeds an anomalous current determination threshold value set beforehand. For instance, the protection control unit 211 determines that an anomaly in the assembled battery 14 has occurred when the temperature of the assembled battery 14, as detected by the temperature sensor 17, exceeds an anomalous temperature determination threshold value set beforehand. The protection control unit 211 performs a protection operation of protecting the assembled battery 14 against anomalies such as overcurrent, overheating or the like, by turning off the switching elements Q1, Q2 in case that any aforementioned anomaly is detected.

The protection control unit 211 prevents deterioration of the rechargeable batteries 141, 142, 143, due to over-discharge, by turning off the switching element Q1 in a case where for instance, any of the terminal voltages V1, V2, V3 of the rechargeable batteries 141, 142, 143, as detected by the voltage detection circuit 15, is equal to or lower than a discharge prohibition voltage Voff set beforehand in order to prevent over-discharge of the rechargeable batteries. The discharge prohibition voltage Voff is set, for instance, to 2.50 V.

Further, the protection control unit 211 prohibits charging of the assembled battery 14, by turning off the switching element Q2, in a case where the maximum value from among any of the terminal voltages V1, V2, V3 of the rechargeable batteries 141, 142, 143, as detected by the voltage detection circuit 15, is equal to or greater than a over-charge voltage Vovp set beforehand.

When a terminal voltage Vt detected by the voltage detection circuit 15 is lower than a first threshold-value voltage Vth1 set beforehand to a voltage value lower than a full charge voltage Vfull, which is the terminal voltage Vt at a time when the assembled battery 14 is in full charge, the charge control unit 212 causes constant current charging to be carried out by requesting to the charging device 3, by way of the communications unit 203, a charge current of a predetermined first current value I1, and causing thereby charge current of the first current value I1 to be supplied by the charging device 3 to the assembled battery 14.

In the case of a lithium ion rechargeable battery, the full charge voltage of one cell in the rechargeable battery is, for instance, about 4.2 V when lithium cobalt oxide is used as the positive electrode active material, and of about 4.3 V when lithium manganese oxide is used as the positive electrode active material. The full charge voltage Vfull, which is the full charge voltage of the assembled battery 14, is about 4.2 V×3=12.6 V in a case where, for instance, the rechargeable batteries 141, 142, 143 are each a single cell of a lithium ion rechargeable battery that uses lithium cobalt oxide as the positive electrode active material.

When the terminal voltage Vt detected by the voltage detection circuit 15 exceeds the first threshold-value voltage Vth1 but is less than the full charge voltage Vfull, the charge control unit 212 causes constant current charging to be carried out by requesting, to the charging device 3, a charge current of a second current value I2 that is smaller than the first current value I1, and causing thereby charge current of the second current value I2 to be supplied by the charging device 3 to the assembled battery 14.

When the terminal voltage Vt detected by the voltage detection circuit 15 is equal to or greater than the full charge voltage Vfull, the charge control unit 212 causes constant voltage charging to be carried out by causing the charging device 3 to supply the full charge voltage Vfull to the assembled battery 14, as charge voltage.

In the above-described example, the current value of constant current charging is controlled on the basis of the terminal voltage Vt, which is the total terminal voltage of the assembled battery 14, using the terminal voltage Vt at a time when the assembled battery 14 is in full charge as the full charge voltage Vfull. However, the charge control unit 212 may use, as the full charge voltage Vfull, for instance the terminal voltage of one cell included in the assembled battery 14 at a time when that cell is in full charge Vfull, and may use a maximum voltage, from among the terminal voltages V1, V2, V3, instead of the terminal voltage Vt.

Herein, the full charge voltage Vfull is 4.2 V in a case where each rechargeable battery 141, 142, 143 (each cell) is, for instance, a lithium ion rechargeable battery that uses lithium cobalt oxide as the positive electrode active material. The cells may form a cell block in which a plurality of cells is connected in parallel.

In constant voltage charging, the charge control unit 212 may cause charge voltage to be supplied by the charging device 3 to the assembled battery 14 in such a manner that the applied voltage per cell distributed to each cell in the assembled battery 14 is the full charge voltage Vfull of one cell. In constant voltage charging, specifically, the charge control unit 212 causes a voltage (for instance, 4.2 V×3=12.6 V), resulting from multiplying the full charge voltage Vfull (for instance, 4.2 V) of one cell by the number of series-connection cells (for instance, 3) in the assembled battery 14, to be outputted from the charging device 3, as a result of which the applied voltage per cell distributed to each cell included in the assembled battery 14 is a full charge voltage Vfull of one cell.

As a first anomaly response process, if the current value Ic detected by the current detection resistor 16 exceeds an anomalous current threshold value Ith set to a value that exceeds a current value requested to the charging device 3, the charge control unit 212 causes constant voltage charging to be carried out by causing a second threshold-value voltage Vth2 to be supplied to the assembled battery 14, as the charge voltage, when the terminal voltage Vt is equal to or greater than a second threshold-value voltage Vth2 set beforehand to a voltage value lower than the full charge voltage Vfull.

The second threshold-value voltage Vth2 may be set, for instance, to the same voltage value as the first threshold-value voltage Vth1, and control may be performed on the basis of total voltage. Alternatively, the second threshold-value voltage Vth2 may be a cell (cell block) voltage equivalent value, and there may be determined whether or not the maximum voltage value of the cells (cell block) exceeds this threshold-value voltage.

During execution of the constant voltage charging, the charge control unit 212 determines that the assembled battery 14 is in full charge, and discontinues charging, when the current value Ic detected by the current detection resistor 16 is equal to or smaller than charge termination current value Ia. The charge termination current value Ia is set to, for instance, about 0.02 It.

As a second anomaly response process, the charge control unit 212 prohibits charging of the assembled battery 14 by turning off the switching element Q2, in a case where the terminal voltage Vt detected by the voltage detection circuit 15 in the first anomaly response process exceeds a anomalous voltage threshold value Vte set to a value that exceeds the second threshold-value voltage Vth2 requested to the charging device 3.

The current value setting unit 213 reduces the first current value I1 and the second current value I2 when the temperature t of the assembled battery 14 as detected by the temperature sensor 17 lies outside an appropriate temperature range that is set beforehand as a temperature suitable for charging of the assembled battery 14. The appropriate temperature range may be set, for instance, to from 10° C. to 45° C.

Specifically, if the temperature t of the assembled battery 14 lies within a appropriate temperature range of, for instance, 10° C. to 45° C., the current value setting unit 213 sets the first current value I1 and the second current value I2 to current values suitable for charging of the assembled battery 14 within an appropriate temperature range. For instance, the first current value I1 is set the 0.7 It, and the second current value I2 is set to a current value smaller than the first current value I1, for instance 0.35 It.

If the temperature t lies outside the appropriate temperature range, for instance, of 10° C. to 45° C., i.e. the temperature t is a low temperature lower than 10° C. (for instance, a low temperature from 0° C. to less than 10° C.) or is a high temperature that exceeds 45° C. (for instance, a high temperature exceeding 45° C. but not higher than 60° C.), the current value setting unit 213 sets, for instance, the first current value I1 to 0.35 It, and the second current value I2 to 0.20 It.

The current value setting unit 213 need not necessarily reduce both the first current value I1 and the second current value I2, and may reduce only one of the foregoing, when the temperature t lies outside an appropriate temperature range.

The current value in constant current charging is not limited to two values, namely the first current value I1 and the second current value I2. Fine-graded current values may be set, in such a manner that the greater the terminal voltage Vt is, the smaller the current value becomes.

The current value setting unit 213 may set finely-graded current decrements in such a manner that the more the temperature t deviates from the appropriate temperature range, the smaller the first current value I1 and the second current value I2 are.

If the temperature t is, for instance, a low temperature lower than 0° C. or a high temperature higher than 60° C., the current value setting unit 213 may set the charge current value of constant current charging to zero. The safety of the assembled battery 14 is enhanced as a result, in that charging is discontinued in states of excessively low temperature or excessively high temperature.

Figure 2:
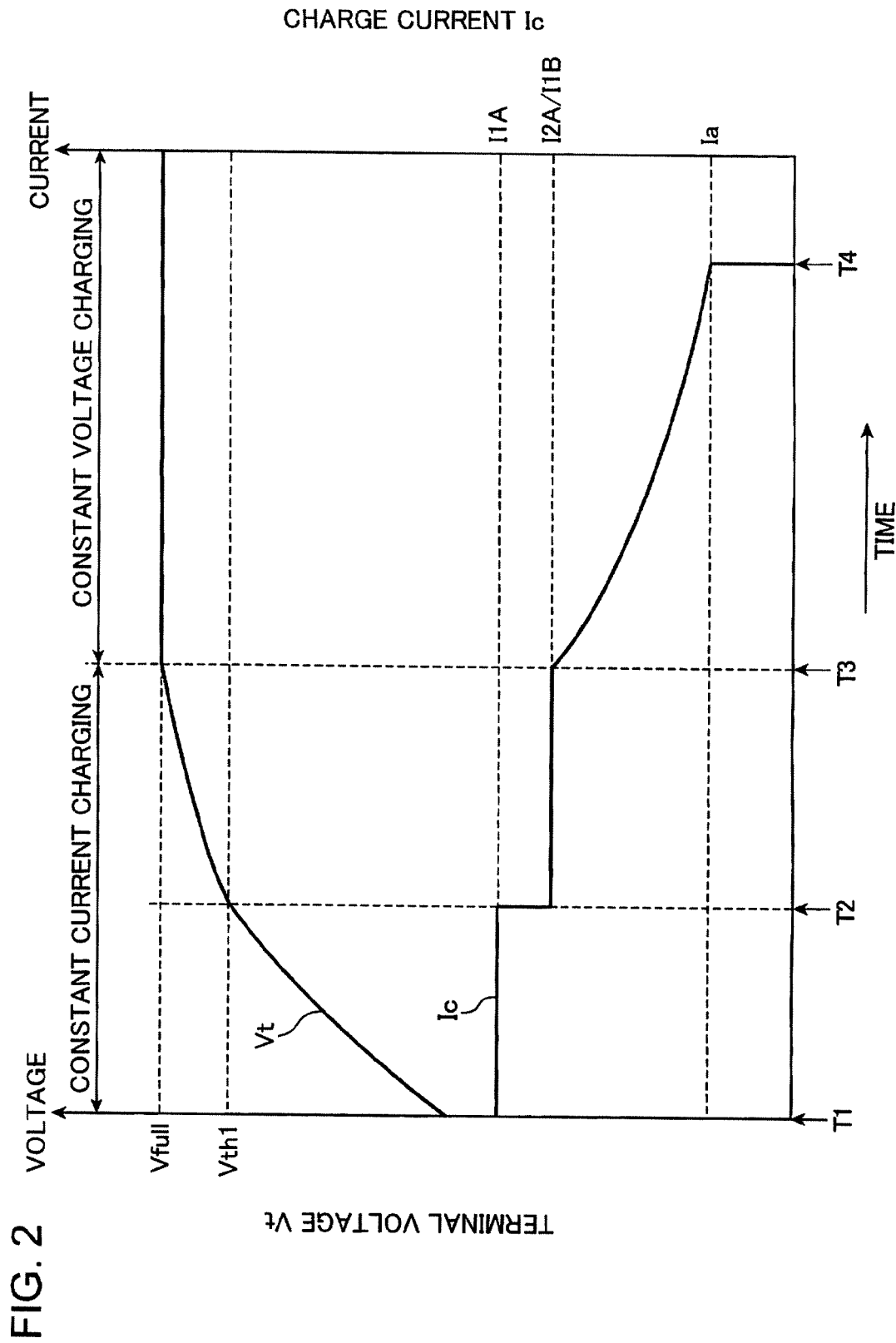
FIG. 2 is an explanatory diagram illustrating an example of the operation of the charge system illustrated in FIG. 1.

The operation of the charge system 1 having the above-described configuration is explained next. FIG. 2 is an explanatory diagram illustrating an example of the operation of the charge system 1 illustrated in FIG. 1. In the figure, the abscissa axis represents elapsed time, the ordinate axis on the left represents the terminal voltage Vt of the assembled battery 14, and the ordinate axis of the right represents the charge current Ic flowing in the assembled battery 14. In the explanation below, the first current value I1 within an appropriate temperature range is notated as I1A, the first current value I1 outside an appropriate temperature range is notated as I1B, the second current value I2 within an appropriate temperature range is notated as I2A and the second current value I2 outside an appropriate temperature range is notated as I2B.

Firstly, the temperature t of the assembled battery 14 is detected by the temperature sensor 17. If the temperature t lies within an appropriate temperature range, for instance from 10° C. to 45° C., the current value setting unit 213 sets the first current value I1 to, for instance, 0.70 It (I1A), and the second current value I2 to, for instance, 0.35 It (I2A).

Next, the charge control unit 212 sends, to the control unit 37 by way of the communications units 203, 36, a request signal requesting current of a first current value I1 (I1A). Thereupon, a charge/discharge current Ic of the first current value I1 (I1A) is outputted from the charge circuit 35, whereby the assembled battery 14 is charged at constant current (timing T1).

The terminal voltage Vt of the assembled battery 14 rises as charging of the latter progresses. When the terminal voltage Vt detected by the voltage detection circuit 15 is equal to or greater than the first threshold-value voltage Vth1 and the assembled battery 14 enters a state where deterioration due to the charge current is likely, the charge control unit 212 sends a request signal to the control unit 37, by way of the communications units 203, 36, to the effect of modifying the charge current Ic from the first current value I1 (I1A) to the second current value I2 (I2A).

Thereupon, the charge circuit 35 modifies the current value in the constant current charging from the first current value I1 (I1A) to the second current value I2 (I2A), and reduces thereby the charge current (timing T2). Herein, the charge current is reduced, and hence deterioration of the assembled battery 14 during constant current charging is reduced thereby, when the terminal voltage Vt of the assembled battery 14 rises to a voltage close to the full charge voltage Vfull and that is equal to or greater than first threshold-value voltage Vth1, and the assembled battery 14 becomes as a result likely to deteriorate due the charge current.

The assembled battery 14 deteriorates more readily due to charge current in a case where the temperature t of the assembled battery 14 lies outside an appropriate temperature range than in a case where the temperature t lies within an appropriate temperature range.

The current value setting unit 213 reduces the first current value I1 to, for instance, 0.35 It (I1B), and reduces the second current value I2 to, for instance, 0.20 It (I2B) when the temperature t of the assembled battery 14 lies outside an appropriate temperature range. Therefore, the charge current during constant current charging is reduced to a greater extent in a case where the temperature t lies outside an appropriate temperature range than in a case where the temperature t lies within an appropriate temperature range. As a result, deterioration of the assembled battery 14 can be reduced vis-à-vis a case where no current value setting unit 213 is used.

The assembled battery 14 is charged then under constant current charging at the second current value I2, and when the terminal voltage Vt detected by the voltage detection circuit 15 is equal to or greater than the full charge voltage Vfull (timing T3), the charge control unit 212 sends, to the control unit 37 by way of the communications units 203, 36, a request signal requesting charge voltage of full charge voltage Vfull.

Thereupon, charge voltage of full charge voltage Vfull is outputted from the charging device 3 and is applied across both ends of the assembled battery 14, and charging moves on to constant voltage charging. The charge current Ic flowing in the assembled battery 14 decreases gradually as constant voltage charging progresses.

When the charge current Ic detected by the current detection resistor 16 becomes equal to or smaller than the charge termination current value Ia and the open-circuit voltage of the assembled battery 14 becomes substantially identical to the full charge voltage Vfull, the charge control unit 212 sends a request signal to the control unit 37, by way of the communications units 203, 36, to the effect of bringing the charge current Ic to zero. Thereupon, the charging device 3 brings the charge current Ic to zero, whereby CCCV charging is terminated (timing T4).

Figure 3:
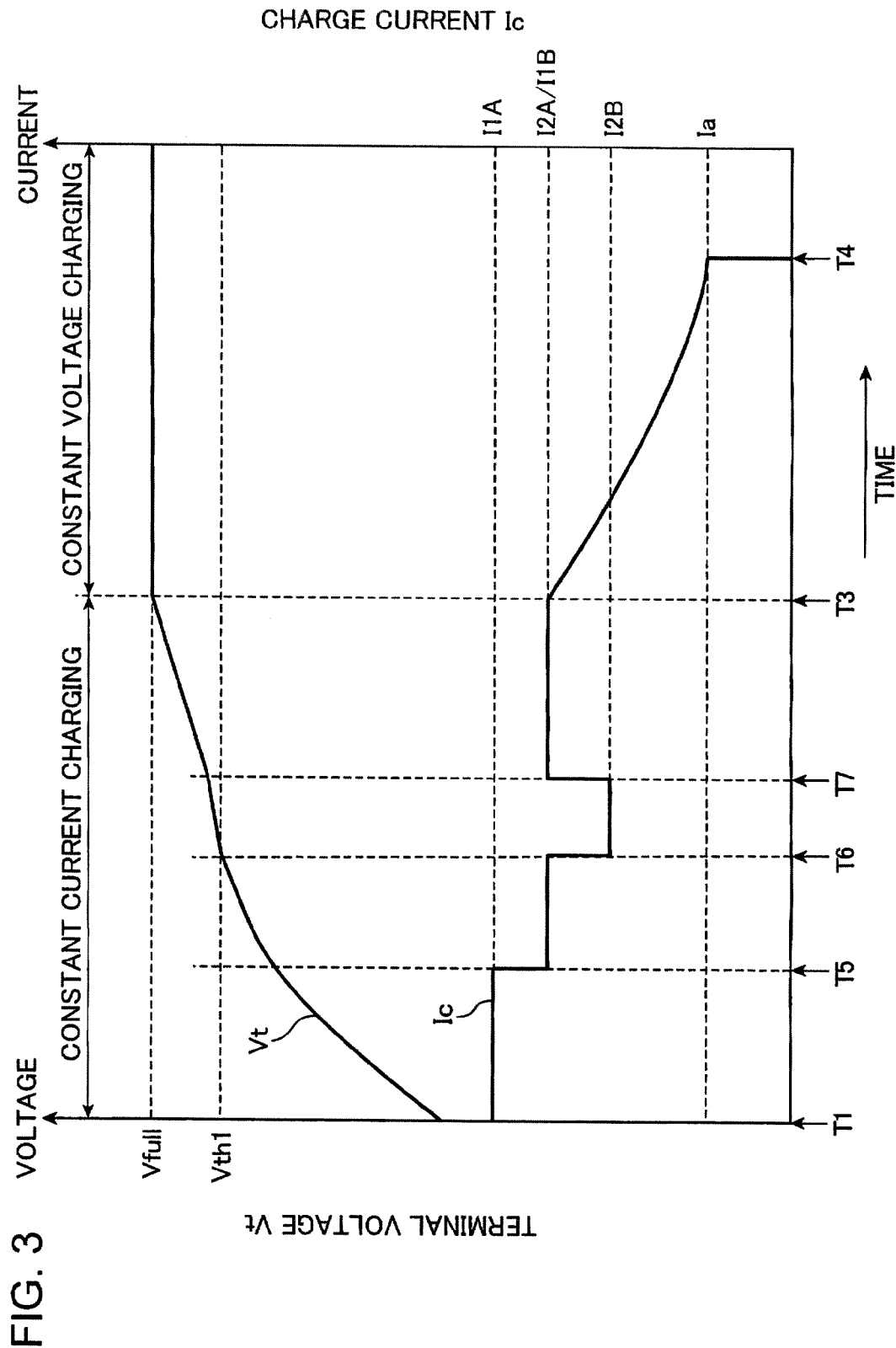
FIG. 3 is an explanatory diagram illustrating an example of the operation of the charge system in a case where temperature in an assembled battery varies during a period over which constant current charging is carried out.

The first current value I1 and the second current value I2 are updated in real time, by the current value setting unit 213, during the period over which constant current charging is carried out. FIG. 3 is an explanatory diagram illustrating an example of the operation of the charge system 1 in a case where the temperature t varies during the period over which constant current charging is carried out.

In a case where, for instance, the temperature t rises and ends up outside an appropriate temperature range at timing T5, the current value setting unit 213 reduces the first current value I1 for instance to 0.35 It (I1B), and reduces the second current value I2 for instance to 0.20 It (I2B). Therefore, the charge control unit 212 sends, to the charging device 3, a signal requesting a charge current of 0.35 It (I1B), and constant current charging is carried out at 0.35 It (I1B).

When, accompanying charging, the terminal voltage Vt of the assembled battery 14 rises to or above the first threshold-value voltage Vth1, the charge control unit 212 sends, to the control unit 37, a request signal to the effect of modifying the charge current Ic from the first current value I1B (0.35 It) to the second current value I2B (0.20 It). Thereupon, the charge circuit 35 modifies the current value of constant current charging to the second current value I2B, whereby the charge current is reduced (timing T6).

When the temperature t of the assembled battery 14 drops back within an appropriate temperature range, for instance, at timing T7, the current value setting unit 213 increases the first current value I1 to, for instance, 0.70 It (I1A) and increases the second current value I2 to, for instance, 0.35 It (I2A). Thereupon, the charge control unit 212 sends, to the charging device 3, a signal requesting a charge current of 0.35 It (I2A), and constant current charging is carried out at 0.35 It (I2A) (timing T7).

Thus, the charge current is increased in a case where the temperature t of the assembled battery 14 changes from outside an appropriate temperature range to within an appropriate temperature range, and hence the charging time is shortened vis-a-vis a case where, once reduced, the charge current stays reduced.

Upon malfunction of the charging device 3, for instance malfunction in the control circuit of the output current value, the actual current value supplied to the assembled battery 14 from the charging device 3 may in some cases increase beyond the current value requested by the charge control unit 212 to the charging device 3, so that the assembled battery 14 may deteriorate as a result.

Therefore, in a case where, for instance, a current detection error by the current detection resistor 16 or the analog-digital converter 201 takes on a current error value Δi, the charge control unit 212, as a first anomaly response process, sets a value resulting from adding the current error value Δi to the first current value I1, as an anomalous current threshold value Ith (I1) for the first current value I1, upon request of the first current value I1 to the charging device 3, and sets a value resulting from adding the current error value Δi to the second current value I2, as an anomalous current threshold value Ith (I2) for the second current value I2, upon request of the second current value I2 to the charging device 3.

Such being the case, the current value Ic detected by the current detection resistor 16 should presumably not exceed the anomalous current threshold value Ith if the charging device 3 is in a normal state. Therefore, if the current value Ic exceeds the anomalous current threshold value Ith, then some anomaly has conceivably occurred in the charging device 3, which may bring about deterioration of the assembled battery 14.

In a case where the current value Ic detected by the current detection resistor 16 exceeds the anomalous current threshold value Ith, and when the terminal voltage Vt is equal to or greater than the second threshold-value voltage Vth2 that is set beforehand to a voltage value lower than the full charge voltage Vfull before the terminal voltage Vt rises up to the full charge voltage Vfull, the charge control unit 212 uses the second threshold-value voltage Vth2 as the charge voltage, i.e. causes constant voltage charging of the assembled battery 14 to be carried out by way of the charging device 3, at a voltage that is lower than the full charge voltage Vfull.

Figure 4:
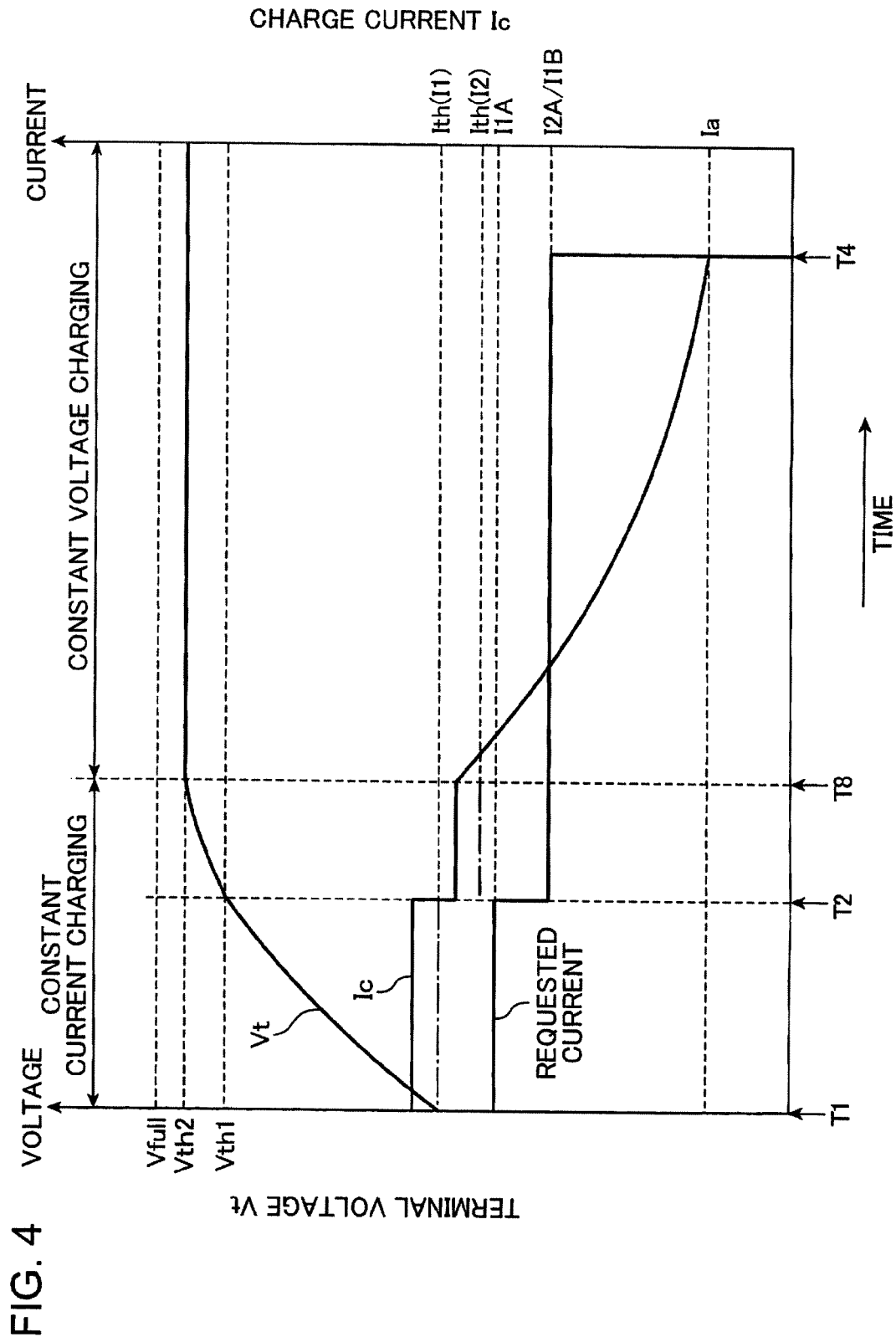
FIG. 4 is an explanatory diagram for explaining an example of a first anomaly response process by a charge control unit.

FIG. 4 is an explanatory diagram for explaining an example of a first anomaly response process in a case where the output current of the charging device 3 is greater than the requested current by the charge control unit 212 due to a malfunction in the current control circuit, for instance, in the charge circuit 35 of the charging device 3. In the example illustrated in FIG. 4, the second threshold-value voltage Vth2 is set to a voltage value that is lower than the full charge voltage Vfull and higher than the first threshold-value voltage Vth1.

In the example illustrated in FIG. 4, the current value Ic detected by the current detection resistor 16 exceeds the anomalous current threshold value Ith (I1) at timings T1 to T2 at which the charge control unit 212 requests the first current value I1A to the charging device 3.

Thus, the charge control unit 212 requests, to the charging device 3, a voltage output of the second threshold-value voltage Vth2, at timing T8 at which the terminal voltage Vt detected by the voltage detection circuit 15 is equal to or greater than the second threshold-value voltage Vth2, and switches then to constant voltage charging.

If the charging device 3 continued the constant current charging until the terminal voltage Vt becomes the full charge voltage Vfull, despite the fact that the current value Ic exceeds the current value (first current value I1A) requested by the charge control unit 212, then charge current might flow as a result in the assembled battery 14 such that the charge current exceeds the requested current by the charge control unit 212 near the full charge voltage Vfull at which the assembled battery 14 deteriorates readily.

However, at timing T8, where the terminal voltage Vt is equal to or greater than the second threshold-value voltage Vth2, the charge control unit 212 requests, to the charging device 3, voltage output of the second threshold-value voltage Vth2, and switches to constant voltage charging. Therefore, charge current decreases from timing T8 onwards, as a result of which the likelihood of deterioration of the assembled battery 14 can be reduced.

Thus, voltage control can be performed normally in some instances even upon malfunction of the current control circuit of the charging device 3. Therefore, the assembled battery 14 can go opening being used, while the likelihood of deterioration of the assembled battery 14 is reduced, by switching from constant current charging to constant voltage charging at the second threshold-value voltage Vth2 that is lower than the full charge voltage Vfull.

In a case where, for instance, the assembled battery 14 is used as a power source in an electric automobile or the like, prohibition of use immediately upon occurrence of some anomaly may entail problems. Therefore, it is preferable that the assembled battery 14 keeps on being used while possible, even if there is a chance that the charging device 3 is malfunctioning. The charge control circuit 4 is thus suited for such an application.

An example has been explained wherein the second threshold-value voltage Vth2 is set to a voltage value that is higher than the first threshold-value voltage Vth1. However, the second threshold-value voltage Vth2 may be set to a voltage value that is equal to or smaller than the first threshold-value voltage Vth1.

Also, an example has been explained wherein the anomalous current threshold value Ith varies in accordance with a requested current value. However, the anomalous current threshold value Ith may, for instance, be fixedly set to a current value greater than the first current value I1A, which is the maximum current value that the charge control circuit 4 can request to the charging device 3.

The assembled battery 14 may deteriorate, and safety may be compromised, when, for instance, the control circuit of the output voltage value of the charging device 3 malfunctions, as a result of which the voltage value actually supplied by the charging device 3 to the assembled battery 14 increases beyond the voltage value requested to the charging device 3 by the charge control unit 212.

Figure 5:
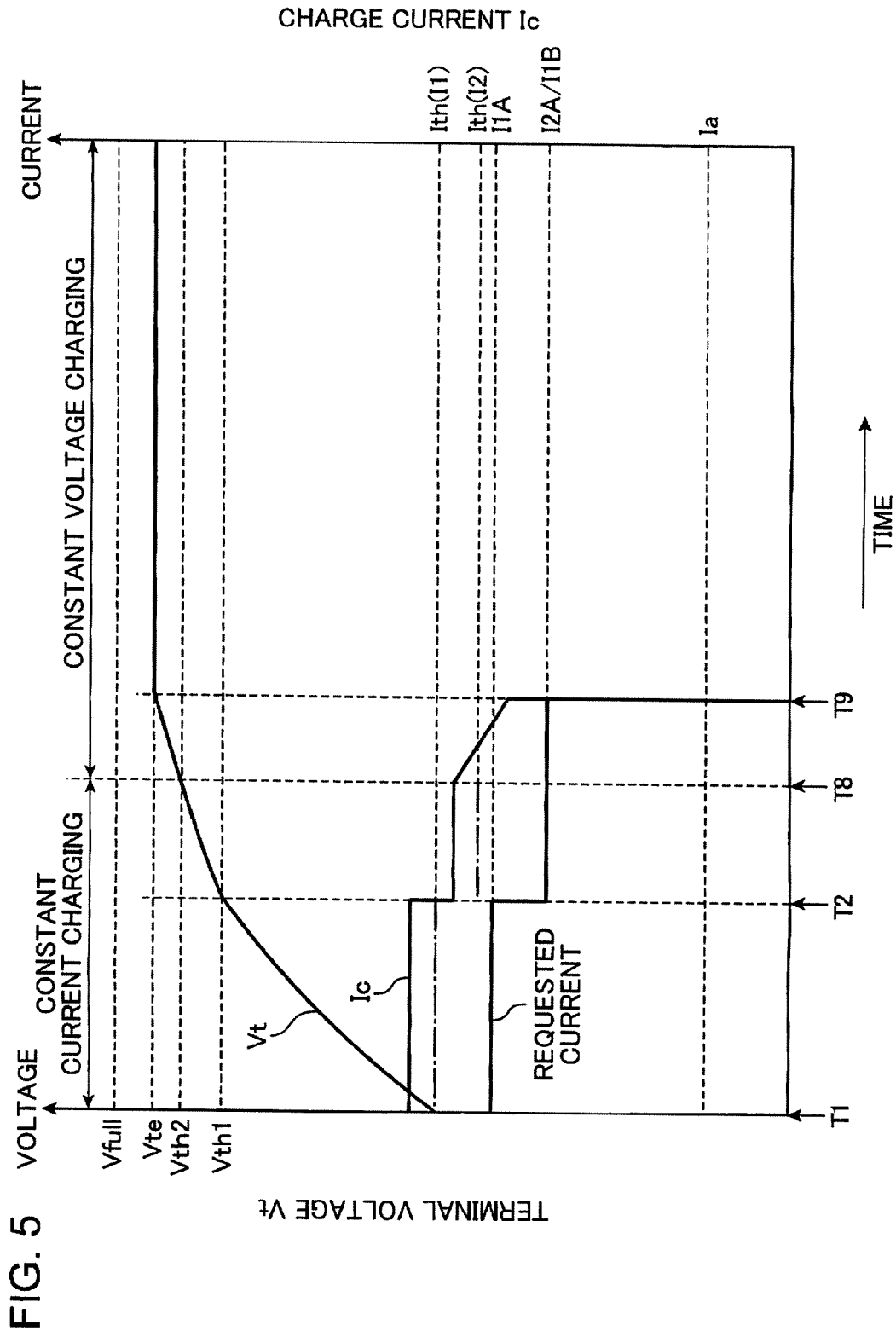
FIG. 5 is an explanatory diagram for explaining a second anomaly response process by a charge control unit.

Therefore, the charge control unit 212 carries out a second anomaly response process. FIG. 5 is an explanatory diagram for explaining the second anomaly response process by the charge control unit 212.

Firstly, in a case where for instance, a voltage detection error by the voltage detection circuit 15 or the analog-digital converter 201 takes on a voltage error value Δv, the charge control unit 212, in a second anomaly response process, sets, as the anomalous voltage threshold value Vte, a value resulting from adding the voltage error value Δv to a voltage value requested to the charging device 3, for instance the second threshold-value voltage Vth2.

At timings T1 to T8, the charge control unit 212 carries out the above-described first anomaly response process. Some anomaly is conceivably occurring in the charging device 3 if the terminal voltage Vt goes on increasing and exceeds the anomalous voltage threshold value Vte also during the period at which constant voltage charging is being carried out at the second threshold-value voltage Vth2 as the charge voltage (requested voltage).

When the terminal voltage Vt exceeds the anomalous voltage threshold value Vte (timing T9), therefore, the charge control unit 212 prohibits charging by turning off the switching element Q2. As a result, deterioration of the assembled battery 14 due to an anomaly in the charging device 3, as well as impairment of safety, become less likely.

The anomalous voltage threshold value Vte is not limited to a value resulting from adding the voltage error value Δv to the second threshold-value voltage Vth2, and may be set, for instance, to a voltage value identical to that of the full charge voltage Vfull.

Likewise, each control threshold value (Vth1, Vth2, Vte) is preferably controlled on the basis of a cell (cell block) voltage equivalent. Specifically, cells that deteriorate the most are conceivably those cells for which cell voltage is maximal during charging. To curb deterioration, therefore, the voltage of each cell block is preferably measured and it is controlled whether the maximum voltage value thereof exceeds or not the threshold-value voltage.

The current value setting unit 213 may be omitted in the protective circuit 4. Also, the charge control unit 212 may be configured in such a manner that the first anomaly response process and/or the second anomaly response process are not carried out.

A charge control circuit according to one aspect of the present invention comprises a charge control unit that controls an operation of a charging unit that charges a rechargeable battery; and a voltage detection unit that detects a terminal voltage of the rechargeable battery, wherein when a terminal voltage of the rechargeable battery as detected by the voltage detection unit is lower than a predetermined first threshold-value voltage, being lower than a full-charge voltage which is a terminal voltage of the rechargeable battery in full charge, the charge control unit causes a constant current charging to the rechargeable battery by requesting the charging unit to supply a charging current of a predetermined first current value, causing the charging unit to supply a charging current of the first current value to the rechargeable battery, when the terminal voltage of the rechargeable battery as detected by the voltage detection unit exceeds the first threshold-value voltage but is less than the full charge voltage, the charge control unit causes the constant current charging to the rechargeable battery by requesting the charging unit to supply a charging current of a second current value that is smaller than the first current value, causing the charging unit to supply a charging current of the second current value to the rechargeable battery, and when the terminal voltage of the rechargeable battery as detected by the voltage detection unit is equal to or greater than the full charge voltage, the charge control unit causes a constant voltage charging to be carried out by causing the charging unit to supply the full charge voltage to the rechargeable battery, as a charge voltage.

When the closed-circuit terminal voltage in the rechargeable battery approaches full charge voltage, through increased SOC, deterioration due to charge current is likelier to occur as compared with when the SOC of the rechargeable battery is small. Therefore, in the above-described configuration, the charge control unit causes constant current charging to be carried out by the charging unit at a charge current of a first current value when the terminal voltage of the rechargeable battery is lower than a first threshold-value voltage set beforehand to a voltage value lower than the full charge voltage, i.e. when deterioration due to charge current is unlikely to occur, thanks to the small SOC of the rechargeable battery.

By contrast, when the terminal voltage of the rechargeable battery exceeds the first threshold-value voltage but is less than the full charge voltage, i.e. when deterioration due to charge current is likely to occur through increased SOC of the rechargeable battery, the charge control unit causes constant current charging to be carried out by the charging unit at a charge current of a second current value that is smaller than the first current value. As a result, the charge current can be reduced when deterioration due to charge current is likely to occur, and hence deterioration of the rechargeable battery can be reduced. Also, constant current charging at the first current value that is greater than the second current value is carried out when deterioration due to charge current is unlikely to occur, and hence the charging time can be shortened as compared with a case where constant current charging is normally carried out at the second current value. Further, CCCV charging can be carried out in that, when the closed-circuit terminal voltage of the rechargeable battery is equal to or greater than the full charge voltage, the charge control unit causes constant voltage charging to be carried out, by the charging unit, with the full charge voltage as the charge voltage.

Preferably, there is further provided a temperature detection unit that detects a temperature of the rechargeable battery; and a current value setting unit that reduces at least one of the first and second current values when a temperature detected by the temperature detection unit lies outside an appropriate temperature range that is set beforehand as a temperature appropriate for charging the rechargeable battery.

The rechargeable battery has an appropriate temperature range that is suitable for charging. The rechargeable battery deteriorates readily if charging is carried out in a low-temperature or high-temperature state outside the appropriate temperature range. In the above configuration, however, at least one of the first and second current values, being current values during constant current charging, is reduced when the temperature of the rechargeable battery lies outside an appropriate temperature range. Deterioration of the rechargeable battery outside an appropriate temperature range is reduced thereby.

Preferably, there is further provided a current detection unit that detects a current flowing in the rechargeable battery, wherein if a current value detected by the current detection unit exceeds an anomalous current threshold value set to a value that exceeds a current value requested to the charging unit, and when the terminal voltage of the rechargeable battery as detected by the voltage detection unit is equal to or greater than a second threshold-value voltage that is set beforehand to a voltage value lower than the full charge voltage, the charge control unit carries out a first anomaly response process of requesting, to the charging unit, a charge voltage of the second threshold-value voltage, and of carrying out constant voltage charging through supply of that charge voltage to the rechargeable battery.

If the operation of the charging unit is normal, the current value detected by the current detection unit should presumably not exceed the anomalous current threshold value set to a value that exceeds the current value requested to the charging unit by the charge control unit. Nevertheless, if the current value detected by the current detection unit exceeds the anomalous current threshold value, then conceivably an anomaly has occurred in the control of the output current of the charging unit. The rechargeable battery might deteriorate if, in this state, the SOC increases through continued constant current charging and a state is eventually reached where the rechargeable battery deteriorates readily.

Therefore, when the terminal voltage of the rechargeable battery is equal to or greater than a second threshold-value voltage that is lower than the full charge voltage, and the rechargeable battery becomes thereby likely to deteriorate, the charge control unit causes constant voltage charging to be carried out, by the charging unit, at the second threshold-value voltage. Upon switchover to constant voltage charging, the charge current decreases naturally as charging progresses, even if an anomaly has occurred in the output current control of the charging unit. The likelihood of rechargeable battery deterioration is reduced as a result, even in a state where the rechargeable battery deteriorates readily.

Preferably, the anomalous current threshold value is a value obtained by adding, to the current value requested to the charging unit, a current error value set beforehand as a value denoting a detection error of a current value by the current detection unit.

The above feature allows increasing the precision with which the occurrence of an anomaly in the control of the output current of the charging unit is determined.

Preferably, there is further provided a charge prohibiting unit that prohibits charging of the rechargeable battery; in the first anomaly response process, if a terminal voltage of the rechargeable battery as detected by the voltage detection unit exceeds an anomalous voltage threshold value set to a value that exceeds the second threshold-value voltage requested to the charging unit, the charge control unit carries out a second anomaly response process of causing the charge prohibiting unit to prohibit charging of the rechargeable battery.

The rechargeable battery might deteriorate, through overcharging or over-voltage, if an anomaly occurs in the control of the output voltage of the charging unit, even upon switchover to constant voltage charging, in a case where an anomaly has conceivably occurred in output current control of the charging unit. In the above configuration, therefore, the charge control unit prohibits charging of the rechargeable battery, by way of the charge prohibiting unit, if a terminal voltage of the rechargeable battery exceeds an anomalous voltage threshold value set to a value that exceeds the second threshold-value voltage requested to the charging unit, i.e. if an anomaly has conceivably occurred also in the control of the output voltage of the charging unit. The likelihood of rechargeable battery deterioration due to an anomaly in the charging unit can be reduced as a result.

Preferably, the anomalous voltage threshold value is a value obtained by adding, to the second threshold-value voltage, a voltage error value set beforehand as a value denoting a detection error of a voltage value by the voltage detection unit.

The above feature allows increasing the precision with which the occurrence of an anomaly in the control of the output voltage of the charging unit is determined.

Preferably, the rechargeable battery is an assembled battery in which a plurality of cells is combined; the voltage detection unit detects a terminal voltage of each of the plurality of cells; and charge control unit uses, as the full charge voltage, a terminal voltage per cell distributed to each of the cells at a time when the assembled battery is in full charge, uses, as the terminal voltage of the rechargeable battery, a maximum voltage from among terminal voltages of the cells, as detected by the voltage detection unit, and causes, in the constant voltage charging, the charging unit to supply a charge voltage to the rechargeable battery in such a manner that an applied voltage distributed to one cell included in the rechargeable battery is a full charge voltage per this cell.

In the above configuration, the current value of charge current in constant current charging is adjusted in accordance with the maximum value from among terminal voltages of each cell, i.e. in accordance with the terminal voltage of the cell having the highest SOC or the cell in which deterioration is deemed to be most advanced, even in cases of unbalanced SOC among respective cells that make up the assembled battery, or in case of variability in the degree of deterioration of the cells. Constant voltage charging is initiated in accordance with the terminal voltage of the cell having the greatest SOC. As a result, charge current setting and initiation of constant voltage charging are carried out taking as a reference the cell most likely to deteriorate through charging, or the cell in which deterioration is most advanced, even in cases of unbalanced SOC among respective cells that make up the assembled battery, or in case of variability in the degree of deterioration of the cells. The likelihood of deterioration in some of the cells that make up the rechargeable battery is reduced as a result.

A battery pack according to one aspect of the present invention comprises the above-described charge control circuit, and the rechargeable battery.

Such a configuration allows reducing rechargeable battery deterioration, in a battery pack, during constant current charging by CCCV charging.

A charge system according to an aspect of the present invention comprises the above-described charge control circuit, the rechargeable battery and the charging unit.

Such a configuration allows reducing rechargeable battery deterioration during constant current charging in a charge system for charging the rechargeable battery by CCCV charging.

The charge control circuit, battery pack and charge system having the above features allow reducing rechargeable battery deterioration during constant current charging by CCCV charging.

The present application is based on Japanese Patent Application No. 2009-145264, filed on Jun. 18, 2009, the content whereof is incorporated herein by reference.

Specific embodiments and examples in the detailed description of the invention illustrate the technical features of the present invention, but should not be narrowly construed as limiting the invention to those specific examples alone. Various modifications can be made without departing from the spirit of the present invention and the scope of the appended claims.

INDUSTRIAL APPLICABILITY

The present invention can be suitably used, in the form of a charge control circuit, and a battery pack or charge system comprising the charge control circuit, to control charging of a rechargeable battery in a device equipped with a battery, for instance, an electronic device such as a portable personal computer, a digital camera or a mobile phone, or a vehicle such as an electric automobile or a hybrid car.

The invention claimed is:

1. A charge control circuit, comprising:
a charge control unit that controls an operation of a charging unit that charges a rechargeable battery;
a voltage detection unit that detects a terminal voltage of the rechargeable battery; and
a current detection unit that detects a current flowing in the rechargeable battery,
wherein when a current value detected by the current detection unit exceeds an anomalous current threshold value set to a value that exceeds a current value requested to the charging unit, and when the terminal voltage of the rechargeable battery as detected by the voltage detection unit is equal to or greater than a second threshold-value voltage that is set beforehand to a voltage value lower than a full charge voltage being a terminal voltage at a time when the rechargeable battery is in full charge, the charge control unit carries out a first anomaly response process of requesting, to the charging unit, a charge voltage of the second threshold value voltage, and of carrying out the constant voltage charging through supply of that charge voltage to the rechargeable battery.

2. The charge control circuit according to claim 1,
wherein when a terminal voltage of the rechargeable battery as detected by the voltage detection unit is lower than a predetermined first threshold-value voltage, being lower than a full-charge voltage which is a terminal voltage of the rechargeable battery in full charge, the charge control unit causes a constant current charging to the rechargeable battery by requesting the charging unit to supply a charging current of a predetermined first current value, causing the charging unit to supply a charging current of the first current value to the rechargeable battery,
when the terminal voltage of the rechargeable battery as detected by the voltage detection unit exceeds the first threshold-value voltage but is less than the full charge voltage, the charge control unit causes the constant current charging to the rechargeable battery by requesting the charging unit to supply a charging current of a second current value that is smaller than the first current value, causing the charging unit to supply a charging current of the second current value to the rechargeable battery, and
when the terminal voltage of the rechargeable battery as detected by the voltage detection unit is equal to or greater than the full charge voltage, the charge control unit causes a constant voltage charging to be carried out by causing the charging unit to supply the full charge voltage to the rechargeable battery, as a charge voltage.

3. The charge control circuit according to claim 1,
wherein the anomalous current threshold value is a value obtained by adding, to the current value requested to the charging unit, a current error value set beforehand as a value denoting a detection error of a current value by the current detection unit.

4. The charge control circuit according to claim 1, further comprising:
a charge prohibiting unit that prohibits charging of the rechargeable battery,
wherein in the first anomaly response process, when a terminal voltage of the rechargeable battery as detected by the voltage detection unit exceeds an anomalous voltage threshold value set to a value that exceeds the second threshold-value voltage requested to the charging unit, the charge control unit carries out a second anomaly response process of causing the charge prohibiting unit to prohibit charging of the rechargeable battery.

5. The charge control circuit according to claim 4,
wherein the anomalous voltage threshold value is a value obtained by adding, to the second threshold-value voltage, a voltage error value set beforehand as a value denoting a detection error of a voltage value by the voltage detection unit.

6. The charge control circuit according to claim 1,
wherein the rechargeable battery is an assembled battery in which a plurality of cells is combined,
the voltage detection unit detects a terminal voltage of each of the plurality of cells, and
the charge control unit:
uses, as the full charge voltage, a terminal voltage per cell distributed to each of the cells at a time when the assembled battery is in full charge;
uses, as the terminal voltage of the rechargeable battery, a maximum voltage from among terminal voltages of the cells, as detected by the voltage detection unit; and
causes, in the constant voltage charging, the charging unit to supply a charge voltage to the rechargeable battery in such a manner that an applied voltage distributed to one cell included in the rechargeable battery is a full charge voltage per this cell.

7. A battery pack, comprising:
the charge control circuit according to claim 1; and
the rechargeable battery.

8. A charge system, comprising:
the charge control circuit according to claim 1;
the rechargeable battery; and
the charging unit.

9. The charge control circuit according to claim 2, further comprising:
- a temperature detection unit that detects a temperature of the rechargeable battery; and
- a current value setting unit that reduces at least one of the first and second current values when a temperature detected by the temperature detection unit lies outside an appropriate temperature range that is set beforehand as a temperature appropriate for charging the rechargeable battery.

* * * * *